United States Patent [19]
Stickney

[11] 3,824,577
[45] July 16, 1974

[54] ACCELERATION AND DECELERATION SENSING AND INDICATING SYSTEM FOR BOATS AND THE LIKE VESSELS

[75] Inventor: Arthur C. Stickney, Scarborough, Maine

[73] Assignee: The Eastern Company, Naugatuck, Conn.

[22] Filed: Oct. 10, 1972

[21] Appl. No.: 296,071

[52] U.S. Cl.................. 340/262, 73/181, 328/132, 340/421
[51] Int. Cl...................... G01p 15/00, G08b 21/00
[58] Field of Search ................ 340/262, 421; 320/1; 328/114, 132; 333/19; 73/181

[56] References Cited
UNITED STATES PATENTS

| | | | |
|---|---|---|---|
| 2,408,711 | 10/1946 | Volz.................................... | 340/262 |
| 3,601,794 | 8/1971 | Blomenkamp et al.............. | 340/262 |
| 3,634,792 | 1/1972 | Blomenkamp et al.............. | 340/262 |

Primary Examiner—John W. Caldwell
Assistant Examiner—Glen R. Swann, III
Attorney, Agent, or Firm—Robert G. Slick

[57] ABSTRACT

An acceleration and deceleration sensing and indicating system is provided to indicate changes in speed of a boat and the like vessel. Acceleration and deceleration of the boat are sensed and monitored by a hull-mounted electrical transducer and associated electronic processing circuitry. Electronic circuitry processes the signal generated by the transducer and operates the respective indicator light and/or lights to display a position (+) indication for acceleration and a negative (−) indication for deceleration. Means are also provided in the electronic circuitry to insure that sudden large changes in speed will not cause the indicator light and/or lights to be energized for undesirably long periods of time and therefore mask subsequent small changes in speed. Thus, in one particular application of this system, a sailboat helmsman is able to evaluate the effect of small changes in the trim of the ship's gear.

7 Claims, 2 Drawing Figures 3,824,577

ACCELERATION AND DECELERATION SENSING AND INDICATING SYSTEM FOR BOATS AND THE LIKE VESSELS

SUMMARY OF THE INVENTION

The present invention relates to a plus-minus differentiator which is particularly adapted for use on boats so that the user can tell instantly the effect of small adjustments which are made in the trim of his rigging. In many instances the boat user is more interested in whether his speed is increasing or decreasing than he is in the actual speed. In the past it has been necessary to watch a speedometer of some sort in order to determine whether the speed is increasing or decreasing. With the present invention a signal is provided in the form of illuminated bulbs, a digital display tube, or the like, so that the user instantly knows when he is gaining or losing speed. Furthermore, the device of the present invention also responds to the magnitude of the change as well as its sign so that the user can judge, not only whether a given adjustment in rigging is good or bad, but also evaluate the magnitude of its effect.

DESCRIPTION OF THE PREFERRED EMBODIMENT

Figure 1:
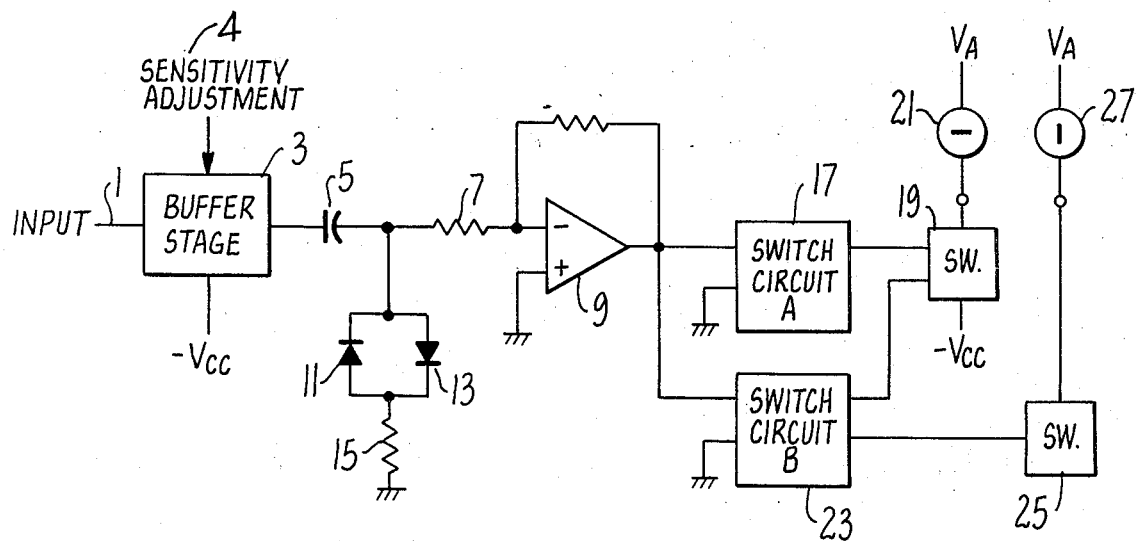
FIG. 1 is a block diagram of a device embodying the present invention.

The general theory of the operation is shown in FIG. 1 of the drawing. The device of the present invention requires a voltage input and this can be any of the electric sensors such as those which are common in the boating art. The input can be from any electrical transducer. Since one is primarily interested in measuring changes in the input voltage, it is not necessary that the input voltage be linear. The input voltage is fed through line 1 from a transducer, not shown, to a buffer amplifier 3 which can be provided with a sensitivity adjustment 4 and is also, of course, supplied with a suitable operating voltage. The voltage from the buffer stage 3 is applied to a capacitor 5, which charges to a particular value, depending upon the voltage output from the buffer stage. Current flowing into the capacitor goes through a resistor 7 which is the input resistor of an inverting operational amplifier 9 or through one of a pair of reverse connected diodes 11 and 13 which are grounded through a resistor 15. Normally the time constant for resistor 7 and capacitor 5 is relatively long, i.e., the resistance of 7 is relatively high, to provide good sensitivity. The time constant of resistor 15 and capacitor 5 is ordinarily much smaller than this value. It will be seen that under steady state conditions the charge on the capacitor will equalize with the signal ground voltage and there will be no input to the operational amplifier. If there is a small change in the output from buffer 3, a current will flow, producing an input to the operational amplifier while the capacitor charges or discharges through resistor 7, again bringing the input back to signal ground voltage. On the other hand, should there be a sudden large excursion in voltage, one or the other of diodes 11 or 13 will cut in, causing a rapid change in charge through resistor 15 until the voltage has been reduced to the cut off voltage of the diode. The reason for providing this will be later apparent. If the voltage at the input drops, the charge on capacitor 5 will become more negative, causing a voltage drop through resistor 7 and which will cause a positive output from operational amplifier 9, which will turn on switch circuit 17, actuating switch 19 and a negative indicator bulb 21. In a very short interval, assuming the speed stays at a reduced constant level, the charge on capacitor 5 will equalize with the signal ground potential so that there is no longer a voltage drop across resistor 7 so that the output from amplifier 9 will drop to 0, turning off switch 17 and thus light 21. Now when the speed increases, the situation will be reversed, causing negative output from the amplifier 9 and turning on switch 23. Switch circuit 23 is connected to both switch 19 and another switch 25, which actuates indicator 27, so that both indicators 21 and 27 will be turned on. It will be noted that indicator 21 consists of a horizontal bar and indicator 27 consists of a vertical bar which have been separated to better illustrate the invention. However, they would ordinarily be superimposed so that if indicator 21 is lit, a negative symbol is produced, while if both are lit, a positive symbol is produced.

Figure 2:
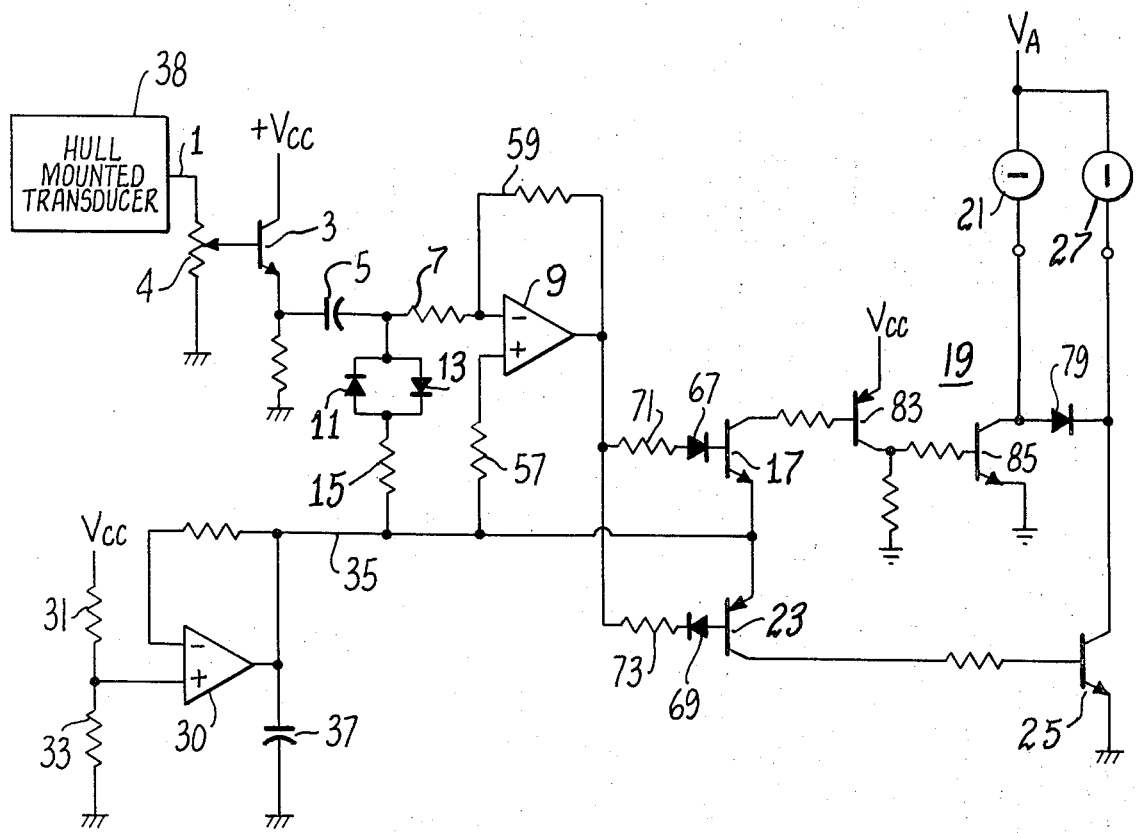
FIG. 2 is a schematic diagram of a practical embodiment of a device of the present invention.

A practical circuit for carrying out the invention is shown in FIG. 2. Since a differential amplifier requires both positive and negative voltage supplies, a power supply is provided which has a stable signal ground voltage of half of the supply voltage. Thus, operational amplifier 30 is connected as a noninverting voltage follower, and its reference voltage is obtained from a voltage divider made up of resistors 31 and 33 which would normally be of equal value. If the voltage supplied to the circuit at Vcc is plus 10, the output on bus 35 would be one-half this voltage or plus 5, which is considered to be the signal ground voltage. A capacitor 37 (suitably 25 mfd) is used to provide a low impedance path at high frequencies and to stabilize the common voltage.

The voltage input is from a hull mounted transducer 38 and is passed through line 1 to a potentiometer 4 which serves as a sensitivity adjustment. The input transistor 3 is connected as an emitter follower and serves as an isolation or a buffer stage and provides a high impedance to the input. The output from the emitter follower is connected to one side of the capacitor 5, the other side of which is connected to the input resistor 7 of the inverting differential amplifier 9 and the reverse connected diodes 11 and 13 which are grounded through resistor 15 to bus 35. Under steady state conditions, the output of capacitor 5 is maintained at ground voltage as previously described. The noninverting input of amplifier 9 is connected to the signal ground bus 35 through a resistor 57 so that under steady state conditions there is no output from amplifier 9. The gain of amplifier 53 is the ratio between feedback resistor 59 and input resistor 7 and can conveniently be about 100.

Output from amplifier 9 is fed to the transistor switches 17 and 23 through diodes 67 and 69 and through suitable isolating resistors 71 and 73. The transistors are complementary, e.g. 17 is NPN while 23 is PNP with the emitters of the transistors being connected to bus 35. The use of diodes 67 and 69 reduces the tendency of the circuit to oscillate. An increasing input signal will result in a negative output from amplifier 9 which will turn on transistors 23 and 25, and this will actuate both the vertical segment of the indicator light 27 and, through diode 79, will also cause the horizontal segment of the indicator light 21 to light. Thus, an increase in voltage at input 1 will cause both lights to light, showing a positive indication, indicating that the ship is accelerating. If the input now remains steady, the charge on capacitor 5 will leak off through resistor 7 (as well as 15 if sufficiently large), so that the input to amplifier 9 will rise to signal ground level, reducing its output to 0, turning off transistors 23 and 25, and causing both lights to go out. Now if the input signal voltage is lowered, amplifier 9 will put out a positive signal turning on transistor 17 and inverting transistor 83 and actuating the switching transistor 85 so that the horizontal light 21 will be lit. Naturally, current cannot flow back through a reverse biased diode 79 to the vertical indicator 27.

The action of the circuit can now be readily understood. If there is only a small change in the boat's speed, resistor 15 is effectively isolated from the circuit by the reverse connected diodes 11 and 13 and one or both signal light segments will light and stay lit for a sufficient length of time for the indication to be seen and evaluated. The capacitor charge will slowly normalize through resistor 7, whereupon the lights will go out. On the other hand, should a large sudden change in speed take place, one of the diodes 11 or 13 will conduct so that most of the capacitor current will flow through resistor 15, rapidly reducing it to the cut off voltage of the diode. Thus, sudden changes in speed will not cause the indicator light to stay on for undesirably long periods of time which might possibly mask subsequent changes.

Many changes can be made in the circuitry without departing from the spirit of this invention. For instance, separate indicators might be used rather than the superimposed dual indicator as described, in which case diode 79 would be eliminated.

What is claimed is:

1. Method for sensing and indicating acceleration and deceleration of a boat and the like vessel comprising the steps of:
   a. producing an input voltage indicative of the speed of said vessel,
   b. changing the charge of a capacitor in accordance with the change in value of said input voltage,
   c. generating control signals indicative of an acceleration and a deceleration of said vessel in accordance with the changing charge of said capacitor,
   d. supplying a constant reference signal ground voltage,
   e. applying said reference voltage to said capacitor and to a means for generating said control signals and to electrical switch means,
   f. equalizing said charge on said capacitor to said reference signal when no acceleration and deceleration of said vessel occur,
   g. activating said electrical switch means with said control signals,
   h. energizing indicator means when said electrical switch means are activated to indicate an acceleration and deceleration of said vessel, and
   i. rapidly adjusting said capacitor charge when sudden large changes in said speed occur to prevent said indicator means from being energized for undesirably long periods of time which may mask subsequent small changes in speed of said vessel.

2. An acceleration and deceleration sensing and indicating system for a boat and the like vessel comprising:

a. circuit means including means to produce an input voltage indicative of the speed of said vessel,
   b. said circuit means including a capacitor which changes charge in accordance with the change in value of said input voltage,
   c. means connected with said capacitor for generating a control signal indicative of an acceleration or deceleration of said vessel in accordance with the change in charge of said capacitor, said control signal being a positive or negative signal,
   d. adjusting means connected with said capacitor for rapidly adjusting said capacitor charge when a sudden large change in said speed of said vessel occurs,
   e. power supply means connected with said circuit for producing a constant reference signal ground voltage and the operating voltages for said indicating system, said reference voltage applied to said capacitor through said means to rapidly adjust said charge of said capacitor and to said means to generate control signals, and to electrical switch means,
   f. said electrical switch means connected in said circuit and activated by said positive or negative control signals,
   g. lighted indicator means connected with said switch means and turned on by said switch means to indicate said acceleration or deceleration,
   h. said means connected with said capacitor for rapidly adjusting said capacitor charge preventing said lighted indicator means from being turned on for undesirably long periods of time which may mask subsequent small changes in said speed of said vessel.

3. The apparatus of claim 2, wherein said means to produce an input voltage includes a hull-mounted transducer means the output of which is connected to a sensitivity adjustment means connected to the input of a buffer amplifier means.

4. The apparatus of claim 2, wherein said capacitor is connected in series with a relatively high resistance, said high resistance connected in parallel with a relatively low resistance which is connected to said reference voltage and connected in series with said adjusting means which comprises a pair of reverse connected diodes, through which said capacitor rapidly adjusts its charge to the cut-off voltage of said diodes when said sudden large changes in said speed of said vessel occur.

5. The apparatus of claim 4, wherein said means for generating said control signals comprises an operational amplifier connected in said circuit means as an inverter including a feedback resistor and an input resistor, said input resistor being said high resistance through which said capacitor changes charge, said amplifier being grounded to said reference voltage.

6. The apparatus of claim 2, wherein said electrical switch means comprises first and second electrical switches, said first switch activated by said positive control signal and said second switch actuated by said negative control signal, said switches comprising complementary transistors connected as a common emitter to said reference voltage.

7. The apparatus of claim 6, wherein said electrical switches are connected to said indicator means, said indicator means comprising superimposed horizontal and vertical segment display means, said horizontal segment energized through said first electrical switch activated by said positive control signal to display a minus symbol indicative of a deceleration of said vessel, and both of said horizontal and vertical segments being energized through said second switch means activated by said negative control signal to display a plus symbol indicative of an acceleration of said vessel.

* * * * *